Aug. 12, 1958  J. A. HAISLET  2,846,817
TREE POISONING AXE
Filed Sept. 6, 1955
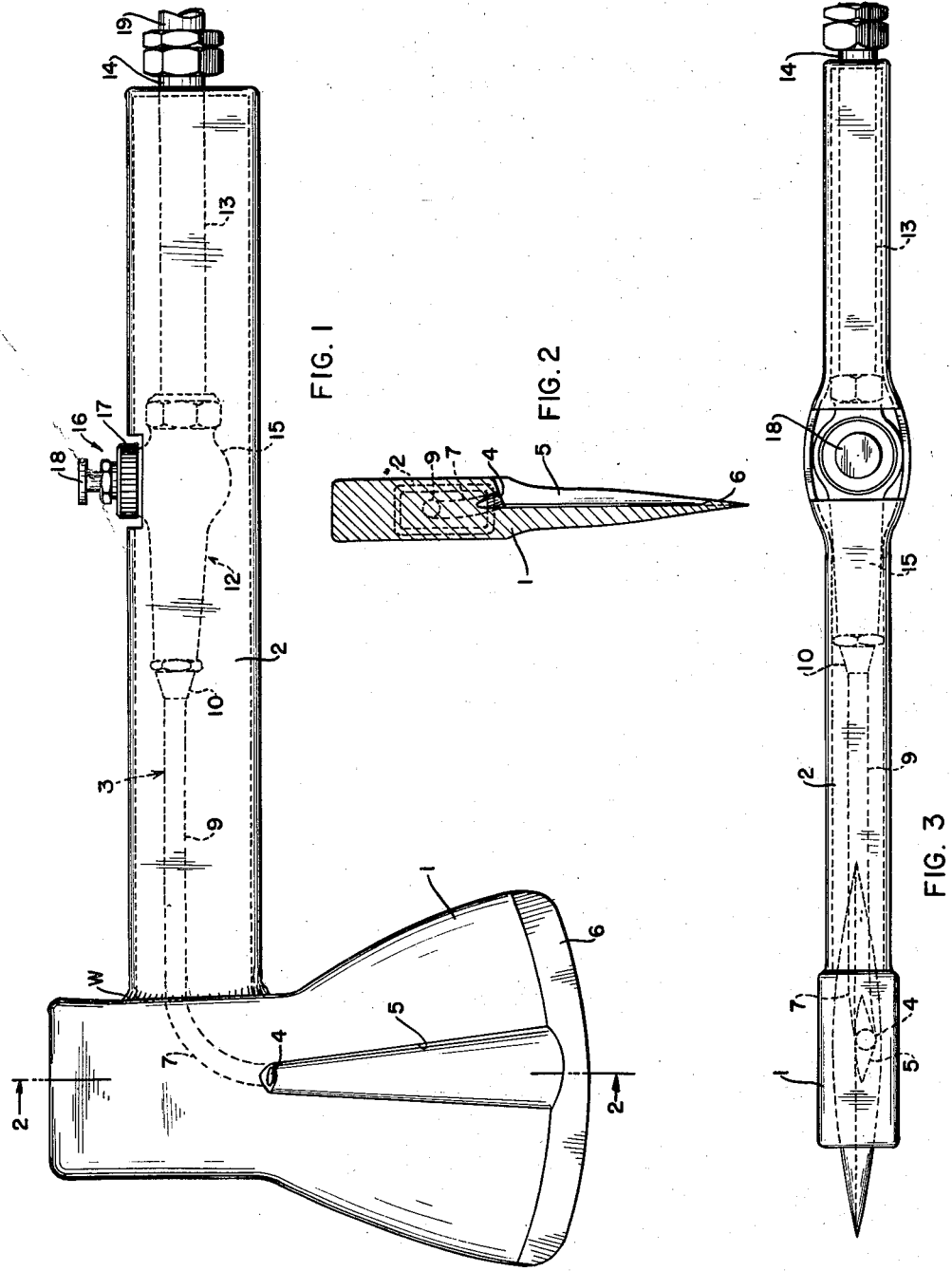
INVENTOR
JOHN A. HAISLET
BY
ATTORNEYS

United States Patent Office 2,846,817
Patented Aug. 12, 1958

2,846,817

TREE POISONING AXE

John A. Haislet, Clinton, N. C., assignor to Riegel Paper Corporation, New York, N. Y., a corporation of Delaware Application September 6, 1955, Serial No. 532,543

3 Claims. (Cl. 47—57.5)

This invention relates to axes or the like for cutting trees and more particularly is concerned with an axe provided with means for feeding to a point adjacent its cutting edge a poison for injection into a cut formed by it in a tree.

Under certain circumstances, it is desirable to remove some or all of the trees from a wooded area. In certain instances, such an operation involves the efforts of a number of workers at least one of whom passes through the wooded area making a cut with an axe or the like completely around each tree to be removed. The purpose of this cut is to sever the bark completely around the trunk of such tree. While this in itself, if the cut is carefully made, will effect a killing of the tree, it is customary to insert into the cut a poison to speed up the killing operation. For this purpose at least one of the remainder of the workers follows each aforementioned worker who forms the cuts, and inserts into the cut in each tree a required amount of poison. It will thus be clear that in order to perform the tree removing operation described, at least two workers must be advantageously employed, or if but one is employed, he must first perform the cutting operation and then the poisoning operation.

In accordance with my invention, however, as indicated above, I provide an axe with means for delivering a poison to a point adjacent its cutting edge whereby the axe may be employed both as a cutting means for performing the cutting operation and as the poison applying means for performing the poisoning operation. Hence in accordance with my invention, the cutting and poisoning operations may be carried out substantially simultaneously by but one worker and during but one trip by him through the wooded area.

Broadly, my invention therefore comprises an axe having a cutting portion and a handle portion and means associated therewith and supported primarily by the handle portion for delivering a poisoning agent advantageously in the form of a fluid to a point adjacent to the cutting edge of the cutting portion so that the application of poison can be effected substantially immediately following the formation of a cut into a tree.

More specifically, my invention comprises an axe head to which is secured a hollow handle. A conduit for carrying poison extends through the handle and into the axe head to a discharge opening in one side face of the axe head. The side face of the axe head is provided with a trough connecting the discharge opening to its cutting edge, the trough advantageously being wider adjacent to the cutting edge than adjacent to the discharge opening. I also provide a valve for controlling the flow of poison through the conduit, the valve being mounted advantageously in the hollow handle with at least a portion of its actuating member extending outwardly from the surface thereof.

A specific embodiment of the invention will now be described in detail in connection with the accompanying drawings, in which Fig. 1 is an elevation view of a tree poisoning axe provided with a conduit for conveying poison to its cutting edge;

Fig. 2 is a sectional view of the tree poisoning axe of Fig. 1 taken along line 2—2 of Fig. 1, and Fig. 3 is a plan view of the axe of Fig. 1.

Referring to Fig. 1, the tree poisoning axe shown therein comprises a head 1 and handle 2. The handle is made of rectangular steel tubing welded to the axe head along weld line W. A conduit indicated generally by the reference numeral 3, passes through the handle and a portion of the head and terminates in a discharge opening 4 in a side face of the head. A trough 5 extends along the surface of the head of the axe from discharge opening 4 to its cutting edge 6. The conduit 3 comprises a curved bore 7 extending through the axe head, a length of flexible tubing 9 passing through the hollow handle and secured at one end to the face of the axe head at one end of bore 7 and at its other end by a threaded connection to the discharge end 10 of a valve 12, and a length of tubing 13 threadedly secured at one end to the inlet end of valve 12 and having its other end 14 threaded and extending from the rear end of handle 2.

The valve 12 comprises a base 15 and a removable actuating valve assembly 16 (the mechanism of which is not shown) inserted into base 15 and threadedly secured thereto by means of knurled nut 17. Valve assembly 16 includes a manually operated plunger 18. Valve assembly 16 passes through an opening in the axe handle so that plunger 18 is exposed in order to permit manual actuation of the valve.

A flexible tubing 19 may be connected to the exposed threaded end of tubing 13 to connect it to a poison containing tank (not shown) which advantageously is of the presure type—that is, it is adapted to contain a supply of poison under pressure. The tank will normally be carried on the user's back, in which case it might also be of an appropriate gravity-flow type.

Fig. 2 is provided to illustrate the manner in which bore 7 connects with trough 5. It also further shows the shape of trough 5 which as will be noted from Fig. 1 is wider adjacent cutting edge 6 than adjacent bore 7.

The described tree poisoning axe may be used in the same manner as a conventional axe for cutting and laying back the bark of a tree to be killed. However, as will now be apparent, it may also be used to insert a poison in the cut formed, immediately after the formation thereof. Since trough 5 is below the surface of the cutting portion of axe head 6 and the discharge end 4 of bore 7 is also beneath the surface, neither interferes with the cutting function of the axe. Nor is either normally blocked or clogged during the formation of a cut. After each imbedding of the axe in the tree trunk to form a cut and before removal thereof, plunger 18 of the valve 12 is pressed and poison is discharged into the tree trunk through conduit 3 and trough 5.

By means of the above described tree poisoning axe the killing of trees may be accomplished both more rapidly and more economically. In one test area, an axe according to this invention has enabled the working of forest acreage at the cost of $4.50 per acre as compared to the average cost of $6. per acre when conventional tree killing methods and apparatus were employed. A preferred embodiment of this invention has been described. Various changes and modifications, however, may be made without departing from the scope of the invention as set forth in the appended claims.

I claim:

1. A tree poisoning axe comprising an axe head affixed to a hollow handle, a poison delivery conduit directed down through the interior of said hollow handle into a bore in said axe head, a shallow trough in a face of the axe head and leading toward the cutting edge of said axe head, said bore in said axe head discharging into said trough, a valve in said delivery conduit for controlling the flow of said poison therethrough, the body of said valve being entirely enclosed within said handle, and valve actuating means protruding therefrom through an aperture in said hollow handle.

2. In a tree poisoning axe as described in claim 1 wherein only said valve actuating means extends exteriorly of said axe.

3. A tree poisoning axe comprising an axe head affixed to a hollow handle, a shallow trough in one face of said axe head extending rearwardly from the cutting edge thereof, a bore directed through said axe head from the rearward end of said trough to the interior of said hollow handle, a conduit within said hollow handle leading from said bore to a valve, said valve being contained within said handle with valve actuating means protruding outwardly through an aperture in said handle, another conduit within said handle leading from said valve to the end of said handle, and means provided at the end of said handle to connect a fluid poison delivery line to said last-mentioned conduit whereby poison may be passed through said handle and axe head into said tree when said valve is opened.

References Cited in the file of this patent

UNITED STATES PATENTS

| 1,536,872 | Bailey | May 5, 1925 |
| 2,770,920 | Little | Nov. 20, 1956 |

FOREIGN PATENTS

| 8,462 | Australia | 1913 |
| 10,197 | Australia | 1913 |
| 708,127 | France | Apr. 27, 1931 |
| 1,565 | Great Britain | 1854 |